(12) United States Patent
Peng

(10) Patent No.: US 11,359,827 B2
(45) Date of Patent: Jun. 14, 2022

(54) DISPENSING BOTTLE

(71) Applicant: Pandian Peng, Shenzhen (CN)

(72) Inventor: Pandian Peng, Shenzhen (CN)

( * ) Notice: Subject to any disclaimer, the term of this patent is extended or adjusted under 35 U.S.C. 154(b) by 153 days.

(21) Appl. No.: 16/691,154

(22) Filed: Nov. 21, 2019

(65) Prior Publication Data
US 2020/0198853 A1    Jun. 25, 2020

(51) Int. Cl.
| *B65D 1/02* | (2006.01) |
| *F24F 6/12* | (2006.01) |
| *B05B 17/06* | (2006.01) |
| *B65D 45/32* | (2006.01) |
| *B65D 47/08* | (2006.01) |
| *B65D 53/02* | (2006.01) |
| *F24F 6/00* | (2006.01) |

(52) U.S. Cl.
CPC ............ *F24F 6/12* (2013.01); *B05B 17/0615* (2013.01); *B65D 1/0246* (2013.01); *B65D 45/322* (2013.01); *B65D 47/0838* (2013.01); *B65D 53/02* (2013.01); *F24F 2006/008* (2013.01); *F24F 2221/12* (2013.01)

(58) Field of Classification Search
CPC .. B65D 47/121; B65D 47/122; B65D 1/0246; B65D 47/0838; B65D 45/322; B65D 53/02; B65D 47/0804
USPC ............................................ 215/44
See application file for complete search history.

(56) References Cited

U.S. PATENT DOCUMENTS

| 4,007,857 | A | * | 2/1977 | Tomiati | B65D 41/3447 |
| | | | | | 222/153.14 |
| 5,316,160 | A | * | 5/1994 | Cautereels | A61J 11/04 |
| | | | | | 215/11.1 |
| 5,810,212 | A | * | 9/1998 | Santagiuliana | B65D 47/0838 |
| | | | | | 215/237 |
| 5,913,436 | A | * | 6/1999 | Breuer | B65D 41/3452 |
| | | | | | 215/252 |
| 6,722,513 | B1 | * | 4/2004 | Flood | A61J 11/04 |
| | | | | | 215/11.1 |
| 9,505,521 | B2 | * | 11/2016 | Berk | B65D 11/04 |
| 2009/0120894 | A1 | * | 5/2009 | Kario | A61J 11/04 |
| | | | | | 215/11.1 |
| 2011/0139740 | A1 | * | 6/2011 | Hakim | A61J 9/04 |
| | | | | | 215/11.5 |
| 2012/0097710 | A1 | * | 4/2012 | Ahmer | A61J 9/005 |
| | | | | | 222/212 |
| 2012/0111821 | A1 | * | 5/2012 | Starr | B65D 23/106 |
| | | | | | 215/235 |
| 2013/0048676 | A1 | * | 2/2013 | Kaufman | B05B 11/3047 |
| | | | | | 222/153.09 |
| 2014/0263149 | A1 | * | 9/2014 | Berge | B67B 3/20 |
| | | | | | 215/44 |
| 2015/0166233 | A1 | * | 6/2015 | Aoe | F17C 13/001 |
| | | | | | 206/524.3 |
| 2017/0008038 | A1 | * | 1/2017 | Bruney | B08B 9/087 |

(Continued)

*Primary Examiner* — Ernesto A Grano

(57) ABSTRACT

A dispensing bottle, comprising a bottle body, a bottle neck connected to the upper portion of the bottle body and a bottle cap connected to the bottle neck; the bottom of the bottle neck extends outward to form a step surface, the top of the bottle body a portion is disposed on the step surface; and further includes a ring sleeve sleeved on the outer side of the bottle neck for squeezing and defining a top end portion of the bottle body which is disposed on the step surface of the bottom of the bottle neck, and is disposed on the outer side of the bottle neck.

11 Claims, 6 Drawing Sheets

(56) References Cited

U.S. PATENT DOCUMENTS

2018/0079552 A1\* 3/2018 Ayeni ................... B65D 1/0246
2018/0360245 A1\* 12/2018 Belmar .................. B65D 1/10
2019/0256260 A1\* 8/2019 Carver .................. B65D 51/24

\* cited by examiner

DISPENSING BOTTLE

TECHNICAL FIELD OF THE INVENTION

The invention relates to the technical field of dispensing bottles, in particular to a novel dispensing bottle with reasonable structural design, outstanding use effect and excellent sealing performance.

BACKGROUND OF THE INVENTION

In recent years, with the continuous improvement of people's living standards, the use of daily necessities has gradually increased, especially some commonly used items that are often carried out, such as dispensing bottles.

Due to the special structural shape, bottling products are very convenient for traveling and carrying around, which provides great convenience for practical use. However, the current bottling products still have many deficiencies. In order to better meet the market demand, technicians in the field have carried out a lot of research and development and experiments from the aspects of the overall structure and use of the bottling, and have achieved good results.

SUMMARY OF THE INVENTION

In order to overcome the problems existing in the prior art, the present invention provides a novel dispensing bottle with reasonable structural design, outstanding use effect and excellent sealing performance.

The solution to solve the technical problem of the present invention is to provide a novel dispensing bottle, comprising a bottle body, a bottle neck connected to the upper portion of the bottle body, and a bottle cap connected to the bottle neck; the bottom of the bottle neck extends outward to form a bottle a step surface, the top end portion of the bottle body is disposed on the step surface; and further includes a ring sleeve sleeved on the outer side of the bottle neck for squeezing and defining the top end portion of the bottle body which is disposed on the step surface of the bottom of the bottle neck.

In one preferred embodiment, the inside of the bottle cap extends toward the lower side to form a limiting ring; a sealing ring for lifting the sealing performance is disposed between the limiting ring and the outer wall of the cap; after the bottle cap is connected with the bottle neck, the top of the bottle neck Contact with the seal ring and squeeze the seal ring.

In another preferred embodiment, the inner wall of the ring sleeve is integrally formed with at least one limiting block; and a limiting body for engaging and defining the limiting block and fixing the ring sleeve is formed outside the bottom of the bottle neck; The top end of the bottle body is pressed by the snap connection of the limiting block and the limiting body.

In another preferred embodiment, the ring sleeve is connected to the outside of the bottle neck by a snap.

In another preferred embodiment, a bottom of the ring sleeve extends downwardly to form a ring of positioning rings; and an annular groove for inserting the positioning ring is formed at a top end of the bottle body; a positioning ring of the ring sleeve is embedded in the annular groove. The top of the bottle is further squeezed to the limit.

In another preferred embodiment, the inner wall of the ring sleeve has at least three limiting blocks; and each of the limiting blocks is annularly equidistantly disposed on the inner side of the ring sleeve; and the outer side of the bottle neck is protruded toward the outer side by at least one turn. The protruding portion; each of the limiting blocks of the ring sleeve is engaged with the protruding portion for connection.

In another preferred embodiment, the bottle body is a silicone bottle body; the bottle neck and the ring sleeve are made of a hard material; and the sealing ring is a soft material ring member.

In another preferred embodiment, the number of the limiting blocks formed by the inner wall of the ring sleeve is at least three; and each of the limiting blocks is annularly equidistantly disposed on the inner side of the ring sleeve; and the limiting body on the outer side of the bottle neck is engaged at the outer circumference of the bottle neck; and, each limit block of the ring sleeve is snapped into an engagement slot for connection.

In another preferred embodiment, the bottle neck is threadedly connected to the bottle cap.

In another preferred embodiment, the ring sleeve is glued to the outside of the bottle neck; and the lower portion of the ring sleeve is placed against the top end portion of the bottle body.

Compared with the prior art, the novel dispensing bottle of the present invention is provided by simultaneously providing a bottle body 11, a bottle neck 15 connected to the upper portion of the bottle body 11, and a bottle cap 13 connected to the bottle neck 15, The bottom of the bottle neck 15 extends toward the outside to form a stepped surface 151. The top end of the bottle body 11 is disposed on the stepped surface 151 for a fixed connection. The ring sleeve 12 defined by the extrusion of the top portion of the body 11 can further ensure the stability and sealing performance of the connection of the bottle body 11, and improve the overall sealing degree and reliability of the product. The design of the design is reasonable and the use effect is outstanding.

BRIEF DESCRIPTION OF THE DRAWINGS

To clearly expound the present invention or technical solution, the drawings and embodiments are hereinafter combined to illustrate the present invention. Obviously, the drawings are merely some embodiments of the present invention and those skilled in the art can associate themselves with other drawings without paying creative labor.

DETAILED DESCRIPTION OF THE INVENTION

Figure 1:
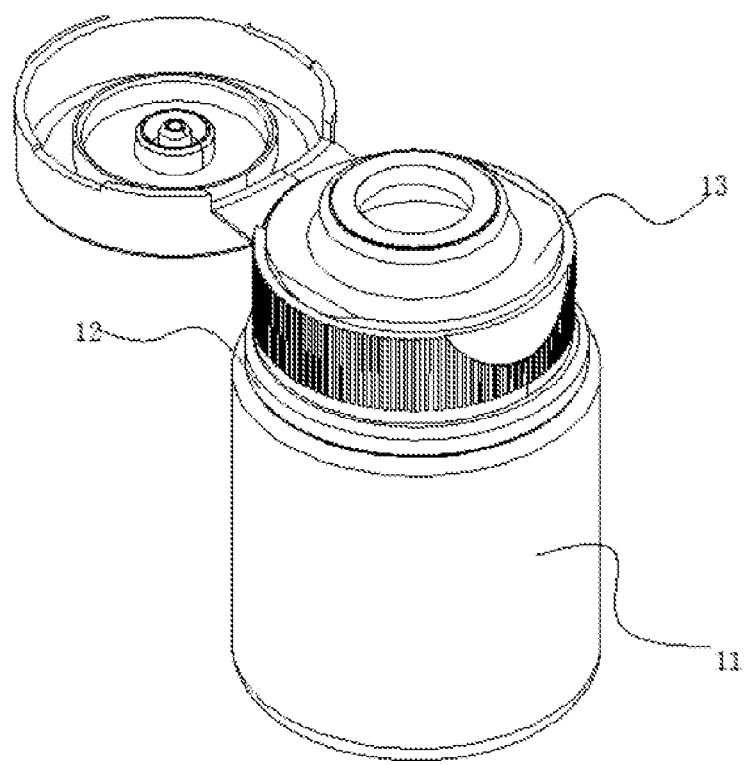
FIG. 1 is a schematic view showing the structure of a three-dimensional state of a novel dispensing bottle according to a first embodiment of the present invention.
Figure 2:
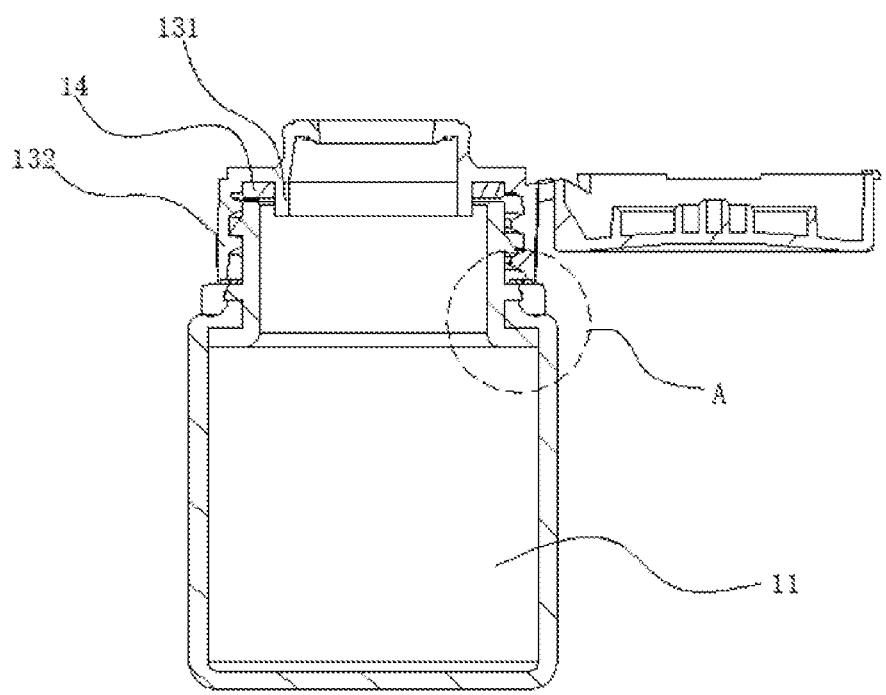
FIG. 2 is a schematic view showing the structure of a cross-sectional state of a novel dispensing bottle according to a first embodiment of the present invention.
Figure 3:
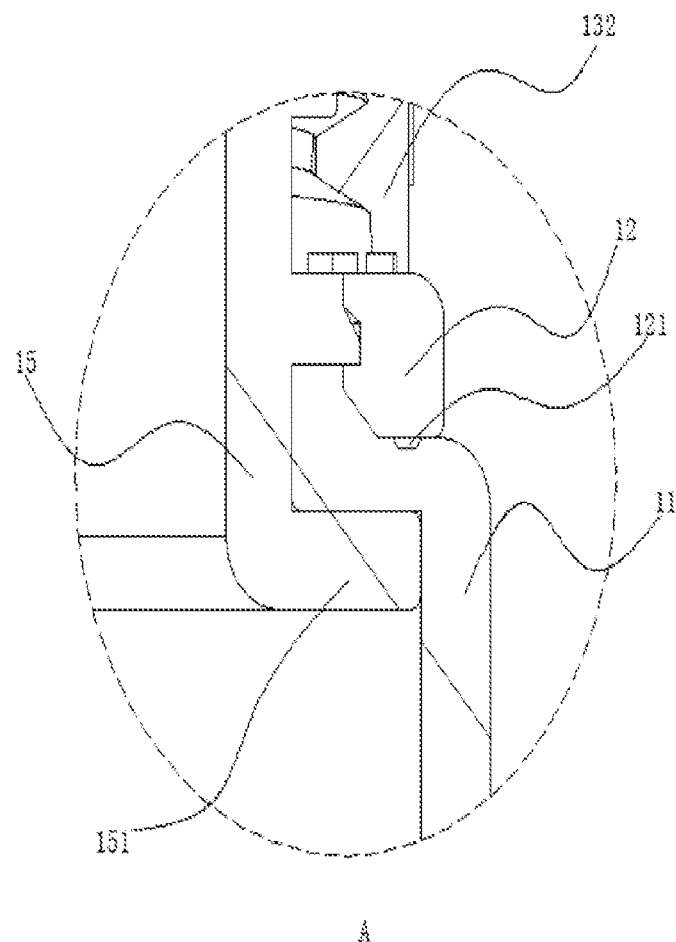
FIG. 3 is an enlarged schematic view of a portion A in FIG. 2.
Figure 4:
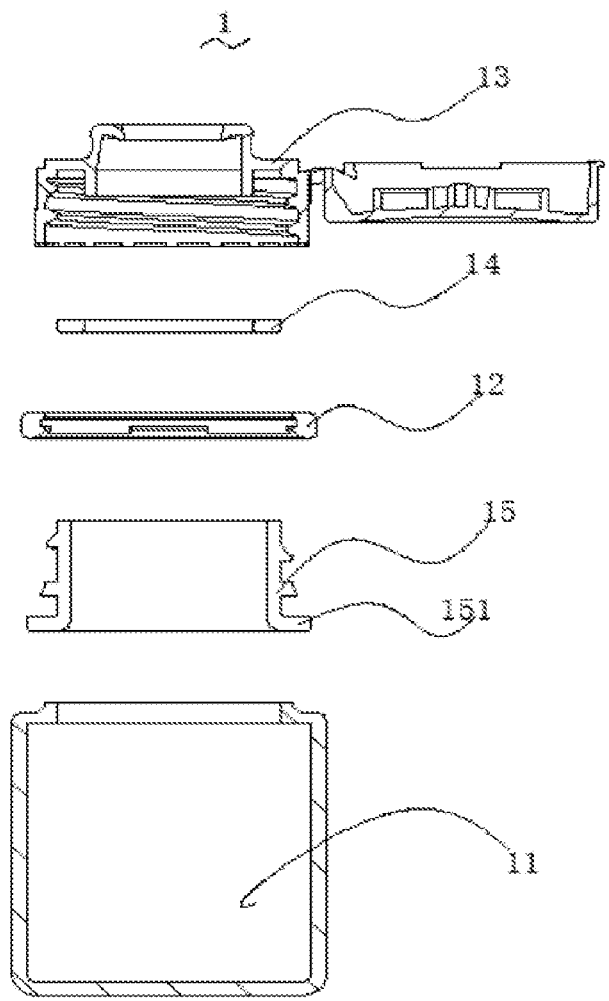
FIG. 4 is a schematic view showing the structure of an explosion state of a novel dispensing bottle according to a first embodiment of the present invention.
Figure 5:
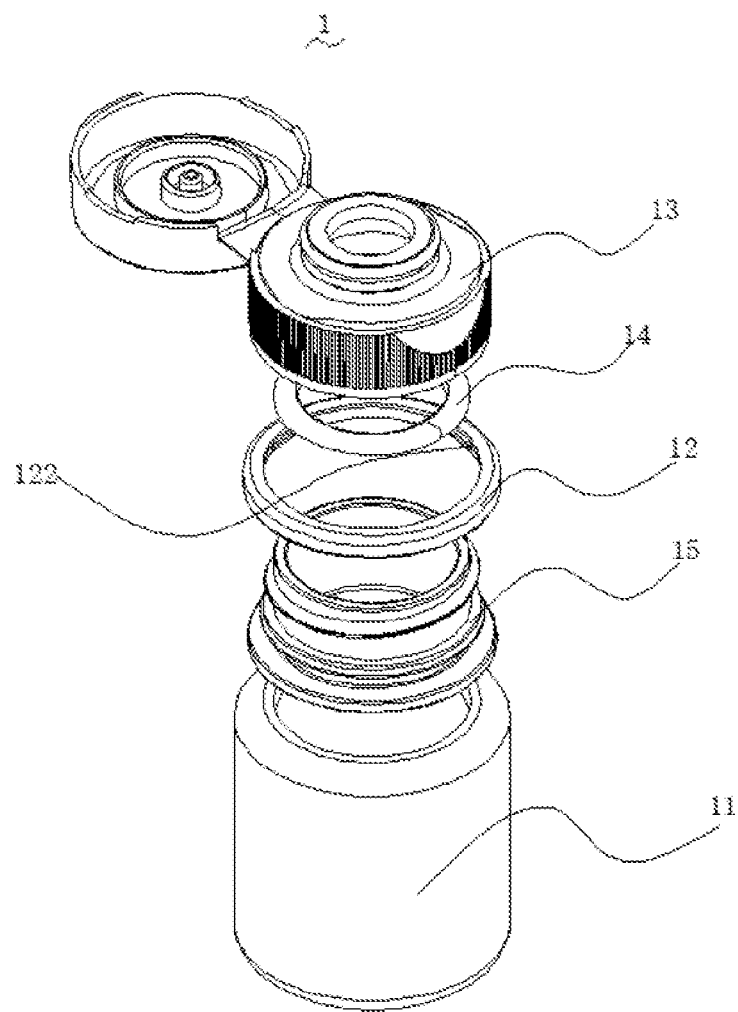
FIG. 5 is a schematic view showing the structure of an explosion state of a novel dispensing bottle according to a first embodiment of the present invention.

The present invention will be further described in detail below with reference to the drawings and embodiments. It is understood that the specific embodiments described herein are merely illustrative of the invention and are not intended to limit the invention.

Referring to FIGS. 1-5, a novel dispensing bottle 1 according to a first embodiment of the present invention includes a bottle body 11, a bottle neck 15 connected to the upper portion of the bottle body 11, and a bottle cap 13 connected to the bottle neck 15. The bottom of the bottle-neck 15 extends outwardly to form a stepped surface 151. The top end of the bottle body 11 is disposed on the stepped surface 151. The sleeve 17 is sleeved on the outside of the bottle neck 15 for locating the bottom of the bottle neck 15. The top end of the bottle body 11 on the face 151 is pressed to define a ring sleeve 12.

In the present application, by simultaneously setting the bottle body 11, the bottle neck 15 connected to the upper portion of the bottle body 11, and the bottle cap 13 connected to the bottle neck 15, the bottom of the bottle neck 15 is extended outward to form a step surface 151 of the bottle. The top end portion of the body 11 is erected on the step surface 151 for a fixed connection. Since the outer side of the bottle neck 15 is further provided with a ring sleeve 12 for squeezing and defining the top end portion of the bottle body 11, which is disposed on the bottom step surface 151 of the bottle neck 15, the stability and sealing performance of the connection of the bottle body 11 can be further ensured and the overall sealing degree and reliability of the product can be improved.

In one preferred embodiment, the inside of the cap 13 extends toward the lower side to form a limiting ring 131; between the limiting ring 131 and the outer wall 132 of the cap, a sealing ring 14 for lifting sealing performance is provided; the top end of the neck 15 is brought into contact with the seal ring 14, and the seal ring 14 is pressed.

In another preferred embodiment, the inner wall of the ring sleeve 12 is integrally formed with at least one limiting block 122; and a limit is formed on the outer side of the bottom of the bottle neck 15 for engaging and defining the limiting block 122 and fixing the ring sleeve 12. The socket 12 is pressed against the top end of the bottle body 11 by the snap connection of the limiting block 122 and the limiting body.

In another preferred embodiment, the ring sleeve 12 is connected to the outside of the bottle neck 15 by a snapping mechanism. After the loop ring sleeve 12 is connected to the bottle neck 15, the ring sleeve 12 is pressed and defined.

In another preferred embodiment, the bottom of the ring sleeve 12 is formed with a ring of positioning rings 121; and an annular groove for inserting the positioning ring 121 is formed at the top end of the bottle body 11; the positioning ring 121 of the ring sleeve 12 is embedded. In the annular groove, the top end of the bottle body 11 is further pressed and restrained.

In another preferred embodiment, the number of the limiting blocks 122 formed on the inner wall of the ring sleeve 12 is at least three; and each of the limiting blocks 122 is annularly equidistantly disposed on the inner side of the ring sleeve 12; the limiting body on the outer side of the bottle neck 15 is at least one; each of the limiting blocks 122 of the ring sleeve 12 is engaged with a protruding portion for connection.

In another preferred embodiment, the bottle body 11 is composed of a silicone material; the bottle neck 15 and the ring sleeve 12 are made of a hard material; and the sealing ring 14 is a soft material ring member.

In another preferred embodiment, the number of the limiting blocks 122 formed on the inner wall of the ring sleeve 12 is at least three; and each of the limiting blocks 122 is annularly equidistantly disposed on the inner side of the ring sleeve 12; the engaging groove of the outer circumference of the bottle neck 15; each of the limiting blocks 122 of the ring sleeve 12 is engaged in the engaging groove for connection.

In another preferred embodiment, the bottle neck 15 and the bottle cap 13 are screwed together.

Compared with the prior art, a novel dispensing bottle 1 of the present invention is provided by simultaneously providing a bottle body 11, a bottle neck 15 connected to the upper portion of the bottle body 11, and a bottle cap 13 connected to the bottle neck 15. The bottom of the bottle neck 15 extends outwardly to form a stepped surface 151. The top end of the bottle body 11 is disposed on the stepped surface 151 for a fixed connection. Since the bottom of the bottle neck 15 is disposed on the bottom step surface 151 of the bottle neck 15, the ring sleeve 12 defined by the extrusion of the top end of the bottle body 11 can further ensure the stability and sealing performance of the connection of the bottle body 11 and improve the overall sealing degree and reliability of the product. The design of the design is reasonable and the use effect is outstanding.

Figure 6:
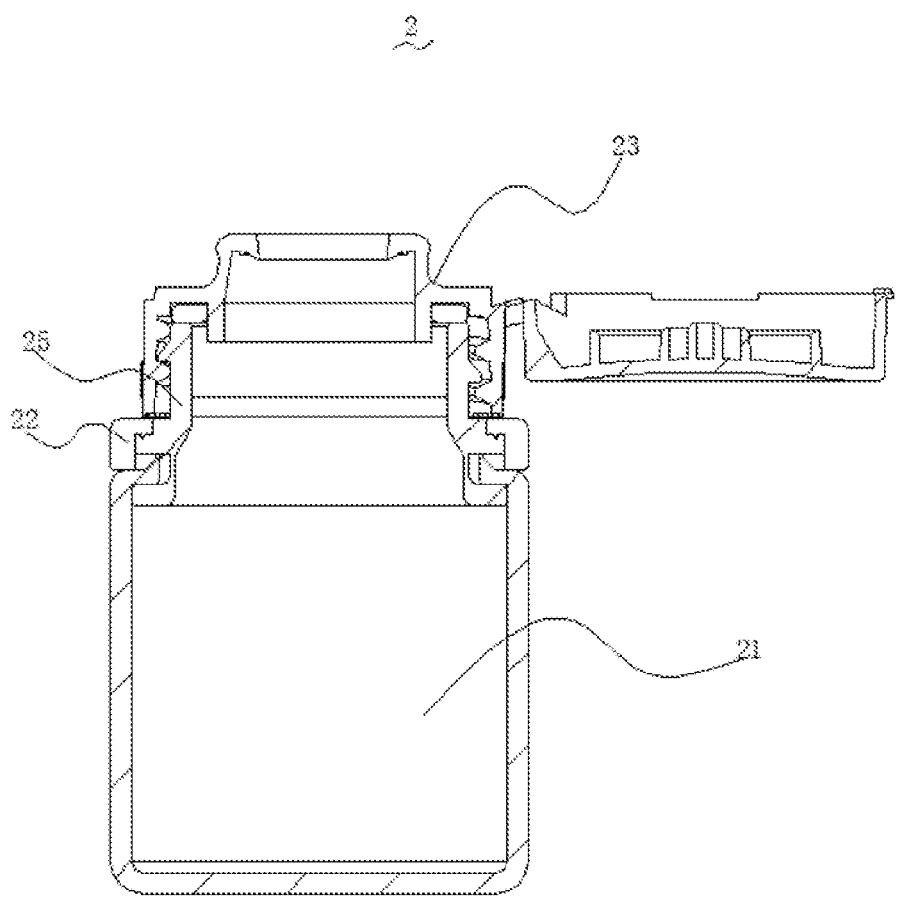
FIG. 6 is a schematic view showing the structure of a cross-sectional state of a novel dispensing bottle according to a second embodiment of the present invention.

Referring to FIG. 6, a second embodiment of the present invention is different from the first embodiment in that the bottle neck 25 is connected to the ring sleeve 22, and the ring sleeve 22 and the outer side of the bottle neck 25 are visible from the figure. Additionally, the lower portion of the loop 22 abuts against the top end of the bottle body 21.

In one preferred embodiment, the ring sleeve 22 is bent in an L shape, and the upper portion of the ring sleeve 22 is disposed on the bottle neck 25. (The second embodiment only needs to describe the difference point.)

The embodiments of the invention described above are not intended to limit the scope of the invention. Any modifications, equivalent substitutions and improvements made within the spirit and scope of the invention are intended to be included within the scope of the appended claims.

The invention claimed is:

1. A novel dispensing bottle, comprising: a bottle body, a bottle neck connected to the upper portion of the bottle body, and a bottle cap connected to the bottle neck, wherein the bottom of the bottle neck extends outward to form a step surface, wherein the step surface is in the shape of a circular ring, wherein top end of the bottle body extends inward to form a circular ring, wherein bottom surface top of the circular ring formed at the top end of the bottle body is disposed on a top surface of the step surface, wherein a ring sleeve on the outer side of the bottle neck, wherein the top end portion of the bottle body is disposed between the ring sleeve and the top surface of the step surface, wherein the inner wall of the ring sleeve is integrally formed with at least one limiting block, wherein a sleeve for defining the outer side of the bottom of the bottle neck is formed, wherein the limiting block and a limiting body are fixed to the ring sleeve, wherein the ring sleeve rises a snap connection of the limiting block and the limiting body to press the top end portion of the bottle body.

2. The dispensing bottle according to claim 1, wherein the inside of the bottle cap extends downwardly to form a limiting ring, wherein a sealing seal is arranged between the limiting ring and the outer wall of the bottle cap, wherein after the cap is connected to the bottle neck, the top of the bottle neck contacts the seal ring and squeezes the sealing ring.

3. The dispensing bottle according to claim 1, wherein the ring sleeve is connected to the outside of the bottle neck by a snapping mechanism.

4. The dispensing bottle according to claim 1, wherein the bottom of the ring sleeve extends downwardly to form a ring of positioning rings, wherein a ring for inserting the positioning ring is formed at a top end of the bottle body, wherein the positioning ring of the ring sleeve is embedded in an annular groove.

5. The dispensing bottle according to claim 1, wherein the inner wall of the ring sleeve has at least three limiting blocks, wherein each of the limiting blocks is annularly and equidistantly disposed on the inner side of the ring sleeve, wherein the limiting body on the outer side of the bottle neck includes a protruding portion extending outward at least one turn, wherein the limiting blocks of the ring sleeve are engaged with and connected to the protruding portion.

6. The dispensing bottle according to claim 1, wherein the bottle body is a composed of silicone, wherein the bottle neck and the ring sleeve are made of a hard material, wherein the sealing ring is composed of a soft material.

7. The dispensing bottle according to claim 1, wherein the inner wall of the ring sleeve has at least three limiting blocks, wherein each of the limiting blocks is annularly equidistantly disposed on the inner side of the ring sleeve, wherein the limiting body on the outer side of the bottle neck includes an engaging groove formed on the outer circumference of the bottle neck, wherein each of the limiting blocks of the ring sleeve is engaged with and connected to the engaging groove.

8. The dispensing bottle according to claim 1, wherein the neck and cap are threaded.

9. The dispensing bottle according to claim 1, wherein the ring sleeve is glued to the outside of the bottle neck, wherein the lower portion of the ring sleeve is placed against the top end portion of the bottle body.

10. The dispensing bottle according to claim 1, wherein the inner wall of the ring sleeve is integrally formed with at least one limiting block, wherein a sleeve for defining the outer side of the bottom of the bottle neck is formed, wherein the limiting block and the limiting body are fixed to the ring sleeve, wherein the ring sleeve uses the snap connection of the limiting block and the limiting body to press the top end portion of the bottle body.

11. The novel dispensing bottle according to claim 1, wherein the ring sleeve is connected to the outside of the bottle neck by a snapping mechanism.

\* \* \* \* \*